Sept. 18, 1962 C. K. GRAVLEY 3,054,606
HEAT REACTION APPARATUS
Filed Feb. 3, 1958
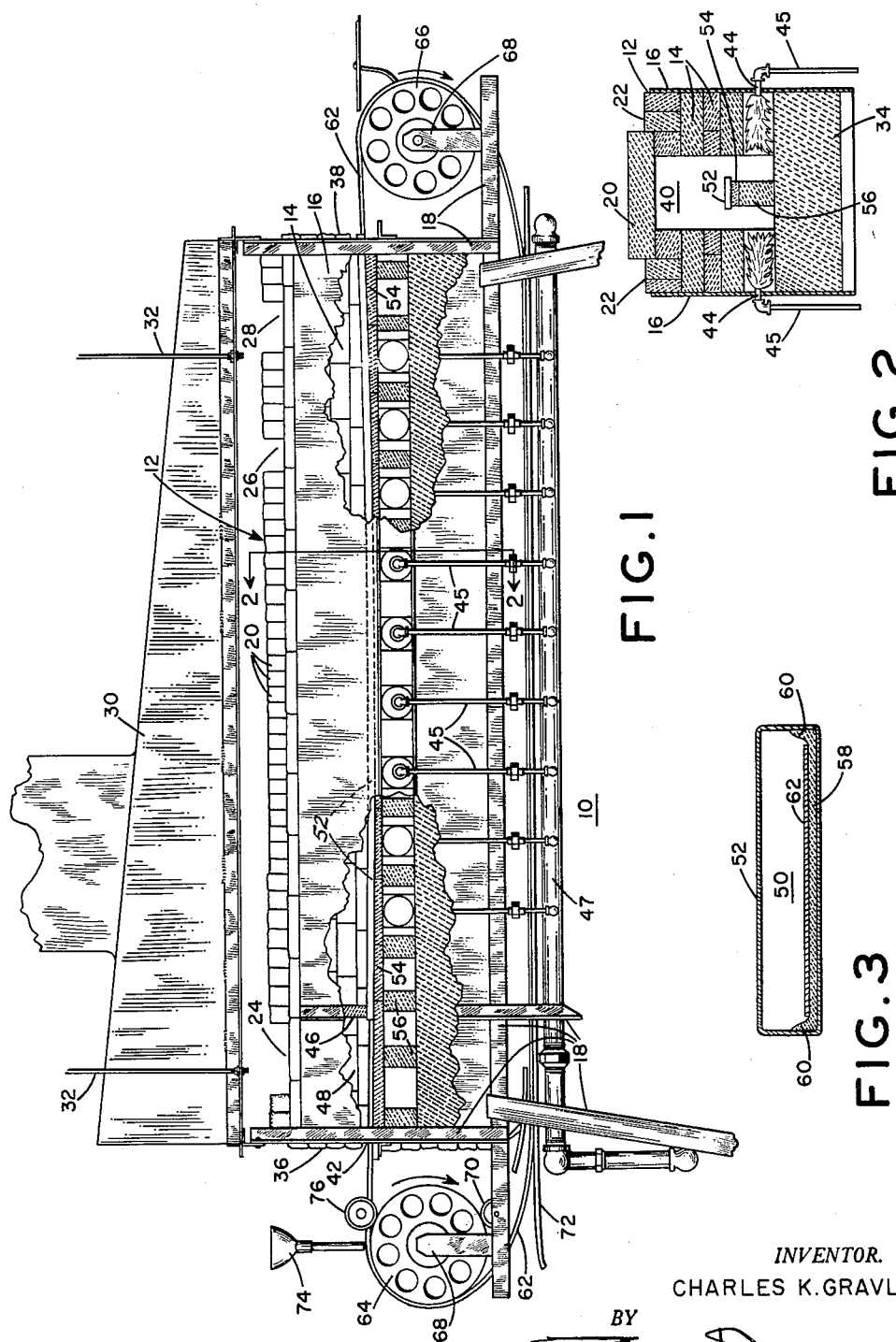
INVENTOR.
CHARLES K. GRAVLEY
BY
*Francis N. Masselle*
ATTORNEY

# United States Patent Office 3,054,606
Patented Sept. 18, 1962

3,054,606
HEAT REACTION APPARATUS
Charles K. Gravley, Willoughby, Ohio, assignor to Clevite Corporation, Cleveland, Ohio, a corporation of Ohio
Filed Feb. 3, 1958, Ser. No. 713,044
7 Claims. (Cl. 263—8)

This invention relates to apparatus for carrying out, as a continuous process, the heat reaction of materials containing volatile constituents.

Inasmuch as the invention is primarily, though not exclusively, useful in sintering and firing ceramic materials, it will be described in that field of application; however, it is pointed out that the term "heat reaction" as used herein refers not only to sintering or pre-calcining of ceramic raw materials, and to firing green ceramic ware to maturity, but also to any other reactions or treatments of materials which require the application of high temperatures. The term "high temperatures" refers to temperatures which, in any event, are sufficient to accomplish the particular heat reaction desired, and further are of such magnitude as would ordinarily result in total or partial loss through volatilization of the particular volatile ingredient contained in the materials being treated.

In the field in which the present invention finds one of its principal applications, viz., the heat reaction of ceramic materials, the loss of volatile constituents has long been a problem albeit, until recently, not a very serious one. The loss of such constituents, lead compounds being a notorious offender in this respect, was a nuisance and posed a rather serious health hazard. However, the amount of lead compound lost and nature of the materials was such that, with suitable precautions as to proper ventilation, the loss could be tolerated without significant detriment to the finished product. For example, lead glazes have been and continue to be widely used in the fabrication of pottery and various other ceramic ware and the problem of lead vapor loss met by ventilation and/or by firing the glazes in an enclosure.

With the discovery of ferroelectric polycrystalline ceramics which can be permanently poled to exhibit an electromechanical response comparable to the well-known piezoelectric effect observed in crystalline quartz, Rochelle salt, tourmaline and the like, the ceramic fabrication art was confronted with problems not previously encountered. One of the most serious of these problems stems from the fact that some ferroelectric ceramics, including some of the finest known, contain lead compounds in high percentage and critical proportions.

The lead loss problem is particularly acute in the lead zirconate titanate ceramics such as disclosed in U.S. Patent 2,708,244 to Bernard Jaffe. As will be noted from the patent disclosure, these ceramics are solid solutions of lead zirconate and lead titanate in various mol ratios. The mol ratios are of great importance in that, according to the patent ceramics containing about 55 mol percent lead zirconate and 45 mol percent lead titanate exhibit the highest piezoelectric coupling. Deviating from this 55/45 ratio in either direction results in a rapid diminution in the coupling coefficient. This is because optimum properties in lead zirconate titanate ceramics require rather close proximity to a morphotropic phase boundary between a rhombohedral phase and a tetragonal phase.

Lead zircontate titanate ceramics customarily are prepared by reaction of the three component oxides, viz., lead oxide (PbO), zirconia ($ZrO_2$) and titania ($TiO_2$). It will be appreciated, therefore, that loss of lead oxide vapor upsets the stoichiometric balance and results in ceramic products which are not properly located with respect to the phase boundary, and, therefore, do not possess optimum piezoelectric properties. The problem of lead loss was recognized by Jaffe and a partial solution offered: the heat treatment is carried out in an enclosure with a source of lead oxide vapor.

This solution is effective to a certain degree but, inasmuch as it is applicable only to batch-type techniques and apparatus, it has two drawbacks: (1) batch processes are not economically competitive with continuous processes in mass production and (2) batch processes are not conducive to uniformity and reproducibility of the product. In addition, while bath processes may be more or less acceptable for the fabrication of ceramic ware of moderate size and in the form of individual pieces, the ceramic articles which currently are produced in the largest volume, viz., phonograph pickup elements, are individually very small in size and are most economically produced by continuous-process methods and apparatus. The physical structure of such elements and continuous process methods and apparatus for certain stages of their production are disclosed in U.S. Letters Patent Nos 2,841,722 and 2,875,501 issued on respective applications Serial Nos. 343,054 and 343,055, both filed on March 18, 1953, and assigned to the same assignee as the present invention.

The present invention contemplates methods and apparatus for carrying out, as a continuous process, the heat reaction of materials containing volatile ingredients.

In accordance with the invention a continuous process furnace comprises an insulating enclosure; refractory means defining an elongate, laterally enclosed passage through the enclosure, the passage having its ends at substantially a common level and sloping to a different level intermediate its ends; a refractory metal conveyor belt transiently disposed within and supported by the bottom wall of the passage; means for moving said belt through said passage; and means for heating the passage to high temperatures.

It is a fundamental object of the invention to provide apparatus for carrying out the heat reaction of materials containing volatile constituents which avoid at least one of the problems of the prior art.

A further, more specific object is the provision of apparatus for heat reacting materials containing ingredients volatile at the reaction temperature without substantial loss of such ingredients through volatilization.

Another object is the provision of apparatus for heat reacting materials in a continuous process in large volume with uniform and reproducible results and at low cost.

These and other objects of the invention, its many advantages and the manner of their realization will be apparent to those conversant with the art from a reading of the following description and subjoined claims in conjunction with the annexed drawing in which, FIGURE 1 is a side elevational view, partly in section, of apparatus embodying the present invention;

FIGURE 2 is a cross-sectional view on line 2—2 of FIGURE 1;

FIGURE 3 is a cross-sectional view showing a portion of FIGURE 2 on a larger scale.

Referring to the drawings and first particularly to FIGURE 1, there is illustrated a continuous process furnace 10 in accordance with the present invention. Furnace 10 comprises an elongated enclosure 12 made up of refractory insulating material such as high temperature insulating bricks 14. In the illustrated embodiment the sides and bottom of enclosure 12 are encased by a sheet metal housing 16 and the entire assembly is supported by a suitable frame 18 built up of angle irons or similar structural members.

The top closure of enclosure 12 is made up of a row of individual refractory blocks 20 juxtaposed along the length of the enclosure and supported on its side walls 22 (FIGURE 2). Blocks 20, thus, are selectively individually removable to define flue openings of various desired areas, numbers and locations in the top of enclosure 12. In the illustrated embodiment three flue openings 24, 26 and 28, are shown. The particular location of flue openings is discussed hereinbelow.

A vacuum exhaust hood 30, suitably supported by vertical corner members of frame 18 and/or hanger rods 32, is disposed over the entire enclosure 12 to carry off noxious fumes and vapors issuing from the flue openings. From the structure thus far described and reference to FIGURES 1 and 2 it will be seen that enclosure 12, comprises side walls 22, top closure blocks 20, a bottom wall or "bed" 34 and end walls 36, 38, all of refractory material, and jointly defining an elongated, tunnel-like chamber 40. Chamber 40 is substantially sealed from the outer atmosphere except for flue openings 24, 26, 28 and a small access opening 42 in end wall 36 the function of which will appear presently.

Chamber 40 is heated to operating temperature by a plurality of gas jets or nozzles 44, best appearing in FIGURE 2, directed inwardly through the side walls 22 of enclosure 12, just above the furnace bed 34. Except at the extreme left hand end of enclosure 12, nozzles 44 are uniformly spaced along the length of the tunnel to provide uniform heating; they are of sufficient capacity to heat the bounding surfaces of chamber 40 and its contents to incandescence. An operating temperature of about 1300° C. is required to carry out the heat reaction which is described hereinafter as an example and is one of the principal utilities of the apparatus. Gas jets 44 are supplied via inlet pipes 45 connecting the individual nozzles to a common inlet manifold 47. Conventional controls (not shown) are provided for gas jets 44 to enable selection and maintenance of the desired temperature in chamber 40.

Spaced a short distance from one end, the left hand end as viewed in FIGURE 1, a transverse interior partition 46 of refractory material is provided in enclosure 12, subdividing a small compartment 48 from the remainder of chamber 40. Compartment 48 is substantially sealed from the remainder of chamber 40 and is vented by flue opening 24. There are no gas jets such as 44 associated with the part of chamber 40 comprising compartment 48. Heating of the compartment is accomplished by radiation and conduction from the remainder of the chamber, consequently, compartment 48 remains at a considerably lower temperature than the rest of chamber 40 as hereinafter more fully discussed.

Defining an elongated, laterally enclosed passage 50 (FIGURE 3) through chamber 40 is refractory tunnel member 52. To accommodate the primary utilization of the apparatus contemplated by the invention, tunnel member 52 is a thin-wall, platinum tube of rectangular cross-section. The cross-sectional dimensions of member 52 are small in comparison to its length; for example, in one embodiment the horizontal or width dimension is about 3 inches, the vertical dimension is about ½ inch, and the length about 5 feet. For purposes of flexibility as well as economy the wall thickness of tunnel member 52 is kept to a minimum consistent with requirements of mechanical strength. The purpose of having member 52 flexible will appear presently.

Tunnel member 52 extends longitudinally through chamber 40 so that both of its ends are accessible from the exterior of enclosure 12. Thus, the right hand end (as viewed in FIGURE 1) of member 52 extends through the respective end wall 38 of enclosure 12. The opposite end of member 52 terminates in compartment 48 close to partition 46 and is accessible through opening 42 in end wall 36 which is suitably aligned with the end of the tunnel member.

Along its entire length, tunnel member 52 rests upon a number of tiles 54 butting end to end and supported above the bed 34 in chamber 40 by vertical tiles 56 placed beneath each butt joint between adjacent tiles 54. Tiles 56 are long enough to support tunnel member 52 a sufficient distance above bed 34 to prevent direct impingement of the flame from gas jets 44.

Tiles 54 are of a refractory material which will not adhere to the material of tunnel member 52 and, preferably, have a similar coefficient of expansion. For a platinum tunnel member, tiles 54 of zirconia have been found satisfactory. Preferably, tiles 54 are in highly porous form to minimize mass, and, therefore, thermal inertia.

The vertical dimension of tiles 56 is smallest in the region midway between the ends of enclosure 12 and grows progressively larger in both directions along the chamber 40 so that the horizontal tiles 54 supported thereby define a sloping support surface for tunnel member 52, which, by reason of its flexibility, conforms to the surface and slopes downwardly from its ends to its central portion. Preferably, the curvature of tunnel member 52 at least approximates a catenary. In one preferred embodiment the midpoint of tunnel member 52 is about 1½ inches lower than the ends. In any case, the midpoint of member 52 should be lower than the ends by at least the amount of the vertical dimension of the member, i.e., so that the inner top wall surface of the tunnel member at its lowest point is lower than the inner bottom surface of the member at its ends.

It is pointed out that the tunnel member 52 is shown and described as sloping downwardly toward its middle section because the volatile ingredient involved in the exemplary materials, viz., lead oxide (PbO), has a vapor heavier than air. Where the vapor of the volatile ingredient is lighter than air tunnel member 52 would slope upwardly toward the middle in the same manner and to the same extent as described above.

Tunnel member 52 may also be constructed of a non-metallic refractory material such as alumina ($Al_2O_3$). In such a case the tunnel member would consist, for example, of three straight hollow sections connected end-to-end with the middle section horizontal and the end sections sloping, upwardly or downwardly as the case may be, toward the entrance and exit of chamber 40.

As best appears in FIGURE 3, the bottom surface of tunnel member 52 is lined with a thin layer 58 of refractory material. In the embodiment being described and for the principal utilization of the apparatus, layer 58 is of a ceramic material which, at high temperatures, does not adhere to platinum, does not react with lead and has a coefficient of expansion similar to platinum. Examples of refractories meeting these qualifications are zirconia, alumina and barium titanate. Liner 58 preferably is in the form of individual tiles to facilitate fabrication of the tunnel member and maintain its flexibility. The lateral edges of liner 58 preferably are provided with raised portions defining longitudinally extending shoulders 60 which center and guide a conveyor belt 62 which will now be described.

Belt 62 is a thin flexible strip of refractory metal, ordinarily the same metal as tunnel member 52 and, therefore, platinum in the present exemplary embodiment. A platinum strip only 2 or 3 mils thick has been found satisfactory for belt 62. It will be appreciated that the thickness of belt 62 as well as that of the walls of member 52 are exaggerated in the drawings for clarity and ease of illustration. The width of the belt depends on the width of tunnel member 52, the belt being sufficiently narrow to be accommodated between shoulders 60.

Belt 62 is a closed loop; one run of the loop is transiently disposed in and traverses through tunnel member 52, sliding on liner 58, and the return run passes beneath enclosure 12. To this end, pulleys or rolls 64, 66 are provided at the respective ends of enclosure 12 suitably rotatably mounted on frame 18 by trunnions 68. Belt 62 is looped over rolls 64 and 66.

Roll 64 is driven in a clockwise direction, as viewed and indicated by the arrow in FIGURE 1, by any suitable means such as a friction driving roll 70. Roll 66 is an idler and serves only to support the exit end of belt 62. Thus it will be seen that belt 62 is pulled through tunnel 52 by the coaction of drive roll 70 and roll 64 which exert tension on the return run of the belt. This arrangement utilizes the slack in the return run to cushion tensile stress on the forward run of the belt which, owing to its high operating temperature, is more frangible. The high cost and fragility of the belt would otherwise present a serious breakage problem. Undue stress on belt 62 is further averted by the provision of a plate 72 mounted under enclosure 12 to support the return run of the belt.

Material to be treated is fed onto belt 62 as or shortly after it passes over roll 64 in any suitable manner. A hopper 74 is diagrammatically shown in FIGURE 1 to exemplify means for feeding pulverulent, granular or particulate material onto belt 62. An idler roll 76 frictionally contacting roll 64 serves to spread out such material on the surface of belt 62. An arrangement of this kind is used when the apparatus is employed, for example, to precalcine or sinter pulverulent ceramic precursors.

The apparatus is also adapted to the handling of long thin strips of material. In this case, the feeding means exemplified by hopper 74 is not used. The strip material is inserted between drive roll 64 and idler 76 which feed it into the tunnel member as will be explained presently in conjunction with a description of the functioning of the apparatus.

As previously explained, the high temperature, heat reaction of materials containing volatile ingredients presents a problem because the volatile constituents "boil away." In the case assumed for example in this description, viz., the preparation of lead zirconate titanate ceramic for electronic components, the difficulty is compounded by the fact that the properties of the material must be reproducible and uniform and are adversely affected by loss (or gain) of the volatile constituent, lead oxide (PbO).

This problem has been overcome by a process of preparation some stages of which may be carried out by use of the above described apparatus. Thus, the materials to be treated are compounded with a small excess of the volatile ingredient. The materials are then heated to the desired temperature while passing through a confined passageway having open ends at substantially a common level and sloping to a different level intermediate its ends.

In applying this method to and using the described apparatus in conjunction with the preparation of lead zirconate titanate from lead oxide (PbO), zirconia ($ZrO_2$) and titania ($TiO_2$) an excess of lead oxide over the stoichiometric proportion amount to about ½% by weight is satisfactory. The raw materials, suitably ground and mixed, are placed in hopper 74 and fed onto belt 62. For pre-calcining, the belt is driven at a linear velocity of about 22 inches per minute and the temperature in chamber 40 is maintained at about 960° C. The materials on belt 62 are carried through opening 42 into entry compartment 48. This compartment, lacking gas jets, is at a lower temperature than chamber 40. The temperature differential between compartment 48 and chamber 40 is in the range of 400° C. or more for handling lead zirconate titanate. In any event, the temperature in compartment 48 should be below the volatilization point of the volatile ingredient.

While moving through compartment 48, any moisture, organic or other low boiling point impurities are burned off. The vapors and products of combustion escape through flue opening 24. This preheat process continues as the material passes into the entry of tunnel member 52.

By the time the material in the tunnel passes the partition 46, it is close to the reaction temperature, which is, therefore, reached almost immediately after the material passes the partition. At the reaction temperature, part of the lead oxide, equivalent more or less to about half of the added excess volatilizes and the vapor formed, being heavier than air, fills at least the middle region of tunnel member 52. The vapor pressure thus established, at the temperatures extant in the tunnel member, is sufficient to preclude entirely or render quantitatively insignificant any further evaporation of lead oxide.

Reacted material, still containing some excess lead oxide, is then compounded into a grog or slip for pressing, extruding, slip-casting or otherwise forming into green ceramic ware which, after drying, is ready for firing.

The function of the apparatus in firing strip stock of green ceramic is similar to that just described. For lead zirconate titanate, belt 62 is driven at a linear speed of about 3 to 4 inches per minute and the temperature in chamber 40 maintained in the range 1260°–1320° C. This is accompanied by temperatures of 600 to 900° C. in compartment 48. While passing through compartment 48, any gelling agents, coagulants, binders or other ancillary components of the green ceramic are burned off. Firing is accomplished as the green stock passes from partition 46 to the exit end of tunnel member 52 where it emerges as completely matured ceramic. The excess lead oxide carried over in the pre-calcination volatilizes more or less completely to provide a vapor pressure of lead oxide to preclude further loss of lead as previously explained.

The maximum weight loss of lead, over and above the added excess, has not exceeded ¼ of 1% with the method and apparatus described herein.

While specific dimensions have been stated for tunnel member 52 and particular values of temperature and belt travel have been given, it will be understood that these are variable and inter-related parameters. Thus, with a higher temperature and/or a longer tunnel member, a higher belt speed might be possible, necessary or desirable. These factors are also influenced by the maturing temperature range of the particular material handled and the quantities of powder or dimensions of the stock being treated.

The requisite temperature for firing and the volatility of the volatile ingredients would of course be taken into consideration in determining the amount of excess of such ingredients added to the materials.

In lieu of adding an excess of the volatile ingredient to the materials, a vapor pressure can be obtained in other ways. Thus, for example, the inner surface of tunnel member 52 could be coated with a source of lead oxide vapor; lead oxide itself or lead zirconate are suitable for this purpose. The coating may be applied directly to the inner surface of the tube or built up by passing lead oxide or zirconate through the tunnel at temperatures exceeding the volatilization temperatures prior to use of the apparatus. Still another manner of obtaining the protective vapor pressure would be to feed small quantities of the lead vapor source onto the belt at intervals simultaneously but not intermixed with the material being reacted.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A continuous process furnace comprising: an insulating enclosure of refractory material having an entry end and an exit end; a hollow, elongate platinum tunnel member of generally rectangular cross-section disposed within said enclosure with its ends accessible from the exterior of said enclosure, said member sloping downwardly from its ends to its mid-point; a thin lining of refractory ceramic material covering the inner surface of the bottom wall of said platinum member; a platinum conveyor belt transiently disposed within said platinum tunnel member and slidably supported on said refractory lining; means for moving said belt through said tunnel member; means for heating the interior of said enclosure and said tunnel member to high temperatures; and means defining a vented compartment at the entry end of said enclosure maintained at a lower temperature than in the remainder of said enclosure, the entry end of said tunnel member opening into said vented compartment.

2. A continuous process furnace comprising: an insulating enclosure of refractory material; a hollow, elongate platinum tunnel member of generally rectangular cross-section disposed within said enclosure with one of its ends projecting therefrom, said member sloping downwardly from its ends to its mid-point; means defining a vented compartment at one end of said enclosure, sealed from the remainder of said enclosure, the other end of said tunnel member opening into said vented compartment; a thin lining of refractory ceramic material covering the inner surface of the bottom wall of said platinum member; a platinum conveyor belt transiently disposed within said platinum tunnel member and slidably supported on said refractory lining; means for moving said belt through said tunnel member from said other end and toward said one end; and means for heating the interior of said enclosure and said tunnel member to high temperatures.

3. A continuous process furnace comprising; means defining an elongated, closed chamber having refractory interior walls; a thin wall open-ended platinum tube of rectangular cross section extending through said chamber, said tube having very small cross-sectional dimensions as compared to its length and being supported within said chamber so that its ends are accessible from the exterior of said enclosure, a section of the length of the tube intermediate its ends being lower than said ends by at least an amount approximately as great as the vertical dimension of the tube's cross-section; a thin lining, of a refractory material which does not adhere to platinum at high temperatures, covering the inner bottom surface of said tube; a thin flexible strip of platinum transiently disposed within said tube and slidably supported on said lining; and means for heating the interior of said enclosure.

4. A continuous process furnace comprising: means defining an elongated, closed chamber having refractory interior walls; a thin wall open-ended platinum tube of rectangular cross section extending through said chamber, said tube having very small cross-sectional dimensions as compared to its length and being supported within said chamber so that its ends are accessible from the exterior of said chamber, a section of the length of the tube intermediate its ends being lower than said ends by at least an amount approximately as great as the vertical dimension of the tube's cross-section; a thin lining, of a refractory material which does not adhere to platinum at high temperatures, covering the inner bottom surface of said tube; a thin flexible strip of platinum transiently disposed within said tube and slidably supported on said lining; means for heating the interior of said chamber; means for moving said strip through said tube at a controlled rate from one end to the other end thereof; means defining a small compartment adjacent said one end of the closed chamber but sealed therefrom said one end of the tube opening into said compartment; and flue means defining vents in said compartment and in said chamber at the end remote from said compartment.

5. A continuous process furnace comprising: an elongated enclosure of refractory insulating material having a top closure made up of a row of individual, contiguously juxtaposed blocks extending along the length of said enclosure, said blocks being selectively, individually removable to define flue openings, of various desired areas, numbers, and locations, in the top of said enclosure; a vacuum exhaust hood disposed over said enclosure; a bed of refractory insulating material filling the bottom of said enclosure and forming, with the side walls, end walls and top closure of said enclosure, an elongated chamber therewithin; a transverse interior partition of refractory material in said enclosure spaced a short distance from one end wall and subdividing a small compartment from the remaining length of said chamber; a thin-wall, platinum tube of rectangular cross section extending longitudinally through said chamber and having one end projecting through the end wall of said enclosure remote from said partition, the other end of said tube extending through said partition and terminating in said compartment short of the adjacent end wall, said tube having a vertical dimension in the order of one-half inch and a lateral dimension in the order of at least twice the vertical dimension; means for supporting said tube within said chamber so that its length roughly approximates a catenary curve with the tube ends at a common level and the midpoint of the tube approximately 1½ inches lower than said ends, said supporting means comprising a plurality of spaced refractory blocks resting on said bed of refractory material and a plurality of relatively thin tiles of a refractory material, such as zirconia, which does not adhere to platinum at high temperatures, supported in end-to-end abutting relation on said refractory blocks, said tube resting upon said tiles; a thin lining of refractory material, such as zirconia, which does not adhere to platinum at high temperatures, covering the interior bottom surface of said tube, the upper surface of said lining having raised longitudinally-extending portions along each side; an aperture in the end wall of said enclosure adjacent said compartment; a closed loop of thin platinum strip, one run of said loop extending through said tube, wherein the strip is slidably supported on said lining between the raised portions thereof, and the return run passing beneath said enclosure; means, including rollers mounted at each end of said enclosure, for supporting the ends of said loop and moving and guiding said strip in an endless path through said tube and return; and a plurality of gas burners on each side of said enclosure, arranged and adapted to heat the refractory inner surfaces of said enclosure to incandescence.

6. A continuous process furnace comprising: an elongated enclosure of refractory insulating material having a top closure; a bed of refractory insulating material filling the bottom of said enclosure and forming, with the side walls, end walls and top closure of said enclosure, an elongated chamber therewithin; a transverse interior partition of refractory material in said enclosure spaced a short distance from one end wall and subdividing a small compartment from the remaining length of said chamber; means defining a flue opening in said small compartment and an additional flue opening in said enclosure adjacent the end remote from said partition; a thin-wall, platinum tube of rectangular cross section extending longitudinally through said chamber and having one end projecting through the end wall of said enclosure remote from said partition, the other end of said tube extending through said partition and terminating in said compartment short of the adjacent end wall, said tube having a vertical dimension in the order of one-half inch and a lateral dimension in the order of at least twice the vertical dimension; means for supporting said tube within said chamber so that the tube ends are at a common level and the midpoint of the tube is approximately 1½ inches lower than said ends, a thin lining of refractory material, such as zirconia, which does not adhere to platinum at high temperatures, covering the interior bottom surface of said tube; an aperture in the end wall of said enclosure adjacent said compartment; a closed loop of thin platinum strip, one run of said loop extending through said tube where the strip is slidably supported on said lining between the raised portions thereof, and the return run passing outside said enclosure; means, for supporting the ends of said loop and moving and guiding said strip in an endless path through said tube and return, said strip entering the tube at the end in said small compartment; and a plurality of gas burners on each side of said enclosure, arranged and adapted to heat the refractory inner surfaces of said enclosure to incandescence.

7. A continuous process furnace comprising: an elongated enclosure of refractory insulating material having a top closure made up of a row of individual, contiguously juxtaposed blocks extending along the length of said enclosure, said blocks being selectively, individually removable to define flue openings, of various desired areas, numbers, and locations, in the top of said enclosure and defining such opening adjacent the opposite ends of said enclosure; a vacuum exhaust hood disposed over said enclosure; a bed of refractory insulating material filling the bottom of said enclosure and forming, with the side walls, end walls and top closure of said enclosure, an elongated chamber therewith; a transverse interior partition of refractory material in said enclosure spaced a short distance from one end wall and subdividing a small compartment from the remaining length of said chamber; a thin-wall, platinum tube of rectangular cross section extending longitudinally through said chamber and having one end projecting through the end wall of said enclosure remote from said partition, the other end of said tube extending through said partition and terminating in said compartment short of the adjacent end wall, said tube having a vertical dimension of about one-half inch and a lateral dimension of about 2½ inches; means for supporting said tube within said chamber so that its length roughly approximates a catenary curve with the tube ends at approximately a common level and the midpoint of the tube approximately 1½ inches lower than said ends; said supporting means comprising a plurality of spaced refractory blocks resting on said bed of refractory material and a plurality of relatively thin tiles of a refractory material, such as zirconia, which does not adhere to platinum, supported in end-to-end abutting relation on said refractory blocks, said tube resting upon said tiles; a thin lining of refractory material, such as zirconia, which does not adhere to platinum at high temperatures, covering the interior bottom surface of said tube, the upper surface of said lining having raised longitudinally-extending portions along each side; an aperture in the end wall of said enclosure adjacent said compartment; a closed loop of thin platinum strip one run of said loop extending through said tube, where the strip is slidably supported on said lining between the raised portions thereof, and the return run passing beneath said enclosure; means, including rollers mounted at each end of said enclosure, for supporting the ends of said loop and moving and guiding said strip in an endless path through said tube and return at linear speeds of from about 3 to 22 inches per minute, said strip entering said tube at the end in said small compartment; and plurality of gas burners on each side of said enclosure, arranged and adapted to heat the refractory inner surfaces of said enclosure to incandescence and obtain temperatures of up to at least 1300° C. therein.

References Cited in the file of this patent

UNITED STATES PATENTS

| | | |
|---|---|---|
| 825,537 | Hoopes | July 10, 1906 |
| 1,792,456 | Willard et al. | Feb. 10, 1931 |
| 2,061,910 | Kingston | Nov. 24, 1936 |
| 2,393,521 | Duncan et al. | Jan. 22, 1946 |
| 2,576,169 | Ashton | Nov. 27, 1951 |
| 2,656,319 | Berge | Oct. 20, 1953 |
| 2,770,523 | Toole | Nov. 13, 1956 |
| 2,774,588 | Oita | Dec. 18, 1956 |
| 2,779,579 | Steinmitz | Jan. 29, 1957 |
| 2,783,207 | Tombs | Feb. 26, 1957 |
| 2,797,075 | Wilbur | June 25, 1957 |
| 2,809,822 | Gier | Oct. 15, 1957 |

FOREIGN PATENTS

| | | |
|---|---|---|
| 492,000 | France | June 24, 1919 |
| 397,729 | Great Britain | Aug. 31, 1933 |